Jan. 10, 1933.　　　　J. H. HARTH　　　　1,894,174
AUTOMOBILE BRAKE TESTER
Filed June 20, 1931　　2 Sheets-Sheet 2
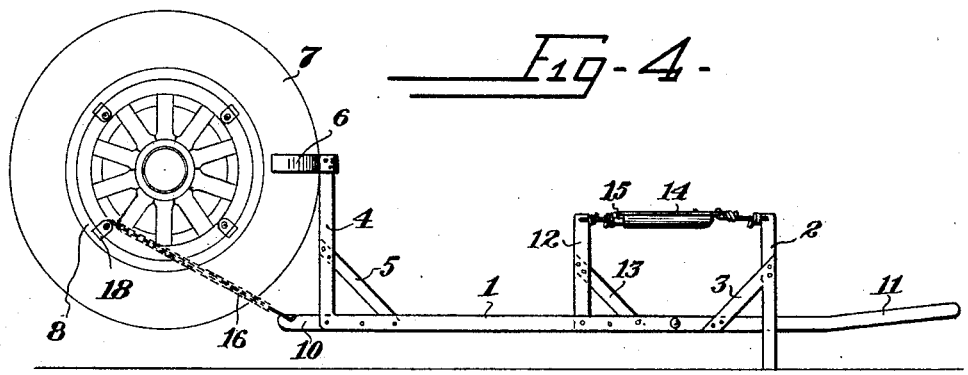
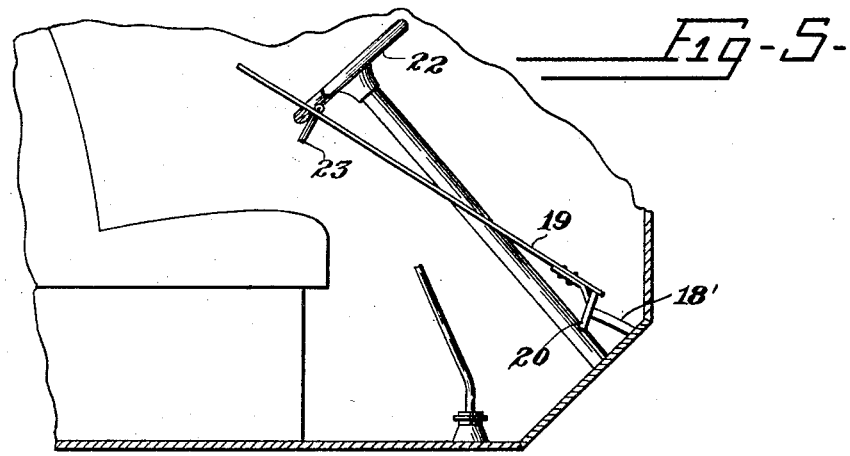
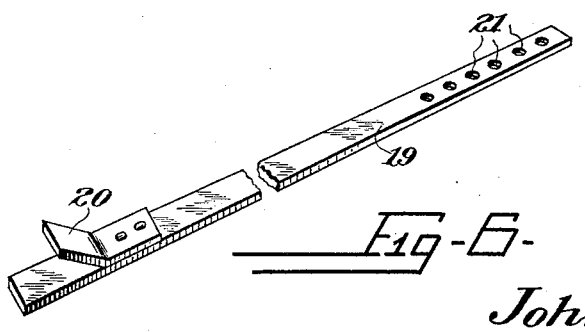
John H. Harth
INVENTOR
BY Victor J. Evans
and Co.　　ATTORNEY Patented Jan. 10, 1933

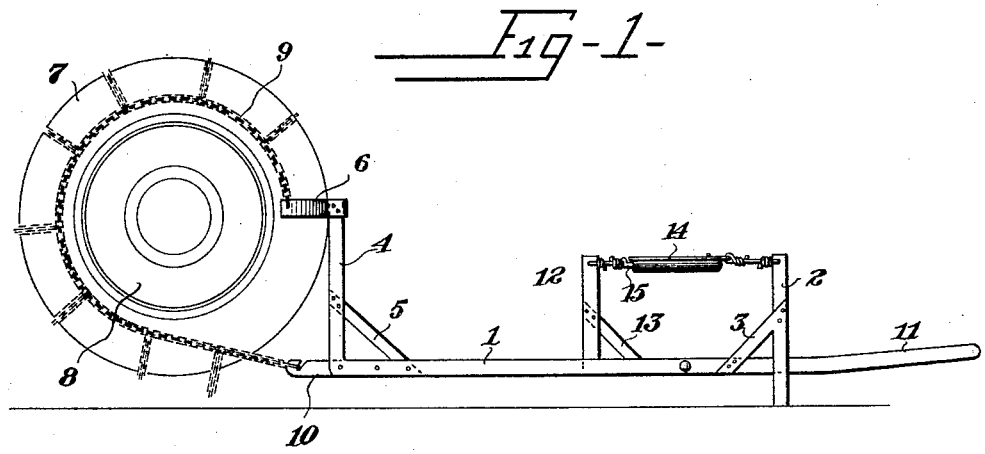
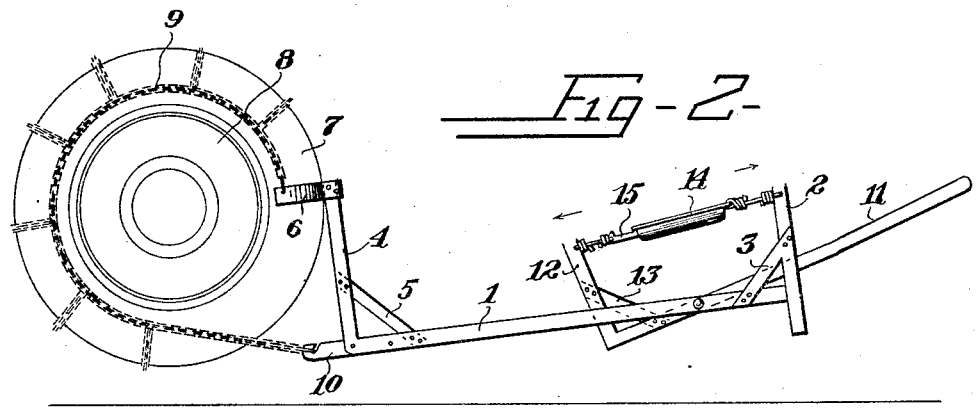
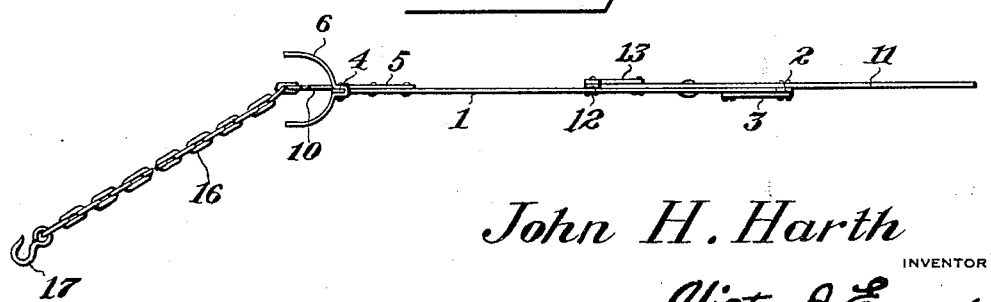

1,894,174

UNITED STATES PATENT OFFICE

JOHN H. HARTH, OF MENDOTA, ILLINOIS

AUTOMOBILE BRAKE TESTER

Application filed June 20, 1931. Serial No. 545,804.

This invention relates to brake testers for motor vehicles and has for the primary object, the provision of a device of the above stated character, whereby a person may accurately determine the braking action of each brake on the vehicle and permit the correcting of any brake which should not be in accordance with the other brakes, thereby assuring proper action of the brakes when applied by the operating medium.

With this and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a brake tester applied to a motor vehicle wheel and constructed in accordance with my invention.

Figure 2 is a similar view showing the tester in an active position.

Figure 3 is a top plan view illustrating a modified form of my invention.

Figure 4 is a side elevation illustrating a modified form of my invention applied to a wheel.

Figure 5 is a fragmentary vertical sectional view illustrating means for holding the brake pedal in brake applying position.

Figure 6 is a perspective view illustrating the brake pedal holding means.

Referring in detail to the drawings, the numeral 1 indicates a bar carrying a supporting leg 2 at one end that extends above and below said bar and is secured thereto by a brace 3. The opposite end of the bar 1 has formed integral therewith a vertically disposed arm 4 reinforced by a brace 5 extending between said arm and the bar. A U-shaped clamp 6 is carried by the free end of the arm 4 to engage the tire 7 of a motor vehicle wheel 8. An attaching element 9 in the form of an anti-skid chain is placed about the tire as shown in Figure 1 with one of the ends attached to the clamp 6 while the opposite end is removably secured to a hook-shaped element 10 carried by the bar 1 at the end thereof which has an arm 4 formed integral therewith.

A lever 11 is pivoted to the bar 1 adjacent the support 2 and has a right angular extension 12 spaced from the support 2 and in parallelism therewith when the lever 11 is arranged in parallelism with the bar 1 as shown in Figure 1. A brace 13 is secured between the lever 11 and the extension 12. A weight scale 14 of any conventional type has the casing thereof attached to the upper end of the support 2 while the operating arm 15 of the scale is attached to the extension 12 of the lever 11.

To employ the above described device for the testing of a brake of a motor vehicle wheel, said wheel is elevated from the ground and the brake applied. The operator lifts upwardly on the lever 11 causing the device to assume a position as shown in Figure 2. The lifting of the lever 11 imparts to the wheel a turning action against the resistance of the applied brake and as the wheel moves against the resistance of the brake, the operator notes the position of the indicator of the scale 14. When all of the wheels of the motor vehicle have been tested in the foregoing manner, the operator notes by the scale 14 the exact position occupied by the indicator of the scale to each wheel which permits him to determine when any one of the brakes require greater leverage to turn the respective wheel or may then correct the braking action of the respective brake so that it will be in accordance with the braking action of the other brakes thereby permitting the brakes of the wheels to be accurately adjusted as to their braking action.

As shown in Figures 3 and 4, a chain 16 may be employed in lieu of the fastener element 9 as shown in Figures 1 and 2 by having one end of the chain secured to the hook shaped element 10 of the bar 1 while the other end of the chain is provided with a hook 17 that may be placed in engagement with one of the demountable rim lugs 18 as shown in Figure 4.

To hold the brake operating medium 18′ in brake applying position, a bar 19 is provided which has secured adjacent one end an angularly disposed plate 20 cooperating with said end of the bar in engaging the brake applying medium as shown in Figure 5. The bar 19 is provided with a series of openings 21 adjacent the other end of said bar and the latter is passed through the steering wheel 22 of the motor vehicle and a removable pin 23 positioned in the proper aperture 21 for the purpose of holding the brake applying medium 18 in brake applying position.

While I have shown and described the preferred embodiment of my invention, it will be understood that minor changes in construction, combination and arrangement of parts may be made without departing from the spirit and scope of my invention, as claimed.

Having thus described my invention, what I claim is:

A brake tester comprising a bar, an extension on one end of said bar and disposed angularly thereto, a flexible element secured to said end of the bar and to the end of the extension and encircling the tire of an elevated wheel having the brake thereof applied, a lever pivoted to said bar, a supporting leg on the other end of the bar and extending angularly thereto, an arm on the lever and extending angularly thereto, and a weight scale attached to said arm and to the leg to indicate the resistance of the brake against the turning of the wheel during manual pivoting of the lever relative to the bar.

In testimony whereof I affix my signature.

JOHN H. HARTH.